UNITED STATES PATENT OFFICE 2,418,203

MANUFACTURE OF SUPERPHOSPHATE FERTILIZERS

John Stauffer, Jr., Los Angeles, Calif., assignor to Stauffer Chemical Company, a corporation of California No Drawing. Application November 14, 1946, Serial No. 709,777

1 Claim. (Cl. 71—40)

This invention relates to the production of a chemical fertilizer and particularly to the manufacture of a superphosphate from calcium phosphate rock.

The manufacture of a superphosphate fertilizer includes (1) the addition and mixing of the finely divided phosphate rock with a regulated quantity of sulphuric acid of suitable strength, (2) "denning" of the resulting mixture, whereby the reaction of the acid with the various components of the rock is allowed to proceed, (3) curing and drying of the acid-treated material followed by (4) milling of the material and bagging for market.

When the foregoing operations are carried on batchwise, acid and rock are weighed out in the proper proportion, mixed together in a suitable mixer, usually a Steadman mixer, until foaming has reached its peak, after which the rock-acid mix is dropped into a "den" where the material is permitted to remain for a period ranging from thirty minutes to one hour. In the "den" the chemical reactions taking place raise the temperature of the mass well above 100° C.; carbon dioxide, steam, and gaseous fluorine compounds, formed by the reactions, partly work their way out of the mass and escape. This formation of gas is very important as it causes the mix to "raise" like bread dough, and fills the mix with bubbles so that it is actually a froth. The calcium sulphate and other phosphate compounds formed in the mix are hydrated by the water present in the acid and, like plaster of Paris, soon set into a firm mass. The presence of gas bubbles in the "denned" material makes it much softer and more easily broken than if the material were solid and dense. If the acid-rock mixture is agitated too long in the mixer, the gases formed are largely lost to the atmosphere and the material in the "den" will be solid and difficult to handle subsequently because of its hardness; furthermore, the porosity of a properly mixed batch renders the subsequent curing and drying of the material a much more rapid operation. In phosphate rocks containing a low content of carbonates, it is sometimes difficult to obtain an easily workable superphosphate because of the lack of gas formation during the reaction; this results in a so-called "flat" batch in the "den" that will not raise and which requires an extensive period of time for drying, and which also becomes exceedingly hard thereafter and difficult to break down from the stock pile and grind in the mill. After the material has been "denned" it is cut out by means of a mechanical scraper and placed upon a pile where it cures and dries out over a period of time ranging from a few days to several weeks, depending upon local conditions. The material is then excavated from the pile (sometimes having to be blasted out with dynamite), milled, and sacked for shipping and use. Various continuous methods of manufacture for acid phosphates have been developed; these generally include mechanical means for carrying on the previously described operations in a continuous manner. Whether batch or continuous, the process is essentially the same.

I have discovered that by using a sulphuric acid sludge, recovered from the so-called hydrocarbon alkylation process, in the manufacture of superphosphate, a remarkable and exceedingly important and valuable physical change is brought about in the rock-acid mixture and the resulting "denned" and cured product. The "denned" material is rendered so soft, dry, and granular that it actually "flows" out of the "den" like sand and requires very little "cutting" in the den as is the case when using ordinary sulphuric acid. The material after curing and drying on the stock pile is relatively soft, pulverent, and has a granular structure which makes its excavation and subsequent milling a relatively simple matter.

Alkylation sulphuric acid sludges result from the use of the sulphuric acid as a catalyst in alkylating low boiling iso-paraffins with olefins. They usually contain between 80% and 90% sulphuric acid equivalent, the remainder being mainly hydrocarbons in combination with the acid, and water. Usually the sludge contains between 85% and 87% sulphuric acid equivalent. I attribute the beneficial action of sludge acid in the manufacture of superphosphate primarily to the fact that when the hydrocarbons in combination with the sulphuric acid in the sludge are heated to such temperatures as are found within the den, they decompose into water vapor, carbon, and large volumes of sulphur dioxide gas which latter product causes the mix to raise and become very light and porous. This release of gas is not to be considered similar to the release of carbon dioxide gas which takes place immediately acid and ordinary phosphate rock are mixed, and which may be dissipated entirely by over agitation in the mixer, but is a reaction that takes place to a great extent after the mixed material has been dropped into the "den" and the temperature elevated to a considerable degree; in this way the presence of the sludge acid makes the proper mixing of acid and rock almost a mechanical detail rather than an "art." Present operations depend to too large an extent on the operator's judgment in deciding when to dump the contents of the mixer into the "den." If he dumps the mix too quickly when using ordinary sulphuric acid, an incomplete reaction will be the result whereas if he mixes too long, a flat batch, which will not dry easily and which is very hard, will be the result. Alkylation sludge acid materially frees the operation from the necessity of reliance on the operator's personal judgment.

In addition to the physical benefits caused by the release of sulphur dioxide gas in the "denned" mix, it is probable that the undecomposed hydrocarbons and traces of free oils present have some action upon the crystallization of the calcium sulphate and phosphate compounds that are formed during the reaction and prevent the formation of welded crystals; in other words, it appears that the crystals exist as many individuals which exist separately rather than as massive groups of crystals bound together by a cementing action. It is quite possible also that the sulphur dioxide released upon the decomposition of the sludge acid may have some definite chemical effect on the mix which renders the product superior in the physical properties I have described.

Sludge acid can be employed by adding it directly to the mixing device and the finely divided phosphate rock, together with whatever amount of water is required to yield a dry product upon curing, or it may be mixed with the water and then added to the rock. The quantity of water required will be determined by the composition of the rock and sludge acid used, and also by local weather and operating conditions. I have found that sludge acid may be either used alone, with whatever water make-up is required to give a volume sufficiently great for proper mixing, or that it may be used along with varying quantities of ordinary sulphuric acid as an additive to give the finished product the desired physical properties previously described. I have found that as little as 5% by weight of alkylation sludge, added to the mixer along with ordinary sulphuric acid, is sufficient to make a noticeable improvement in the physical properties of the finished superphosphate.

It is, in general, the broad object of the present invention to provide a process for the manufacture of an acid phosphate fertilizer utilizing an alkylation suldge completely or partly in place of ordinary sulphuric acid.

Another object of the present invention is to provide a process for the manufacture of an acid phosphate fertilizer which cures to a soft, pulverent, and granular condition. The practice of the invention will be made further apparent upon considering the further detailed operations which are set forth by way of example but not by way of limitation.

Twelve hundred pounds of finely ground phosphate rock and 750 pounds of 87% alkylation sulphuric acid sludge were added in four batches to a Steadman mixer suitably ventilated to remove fumes. The heat of reaction decomposed some of the hydrocarbons and the gaseous products were swept off the reacting mixture together with steam and fluorine compounds. After mixing each batch, the material was dropped into the "den" where it was permitted to remain for about 30 minutes, during which time the temperature rose and decomposed more of the hydrocarbon compounds to form $SO_2$ gas, et cetera, causing the batch to raise, after which time it was removed to a pile to cure and dry. After about ten days it was ready for market, being then dry and granular. The usual curing and drying time for the phosphate rock utilized is about twenty-one days, and in addition, it must be milled after curing and drying. The product analyzed as follows (twenty-four hours after manufacture):

Total $P_2O_5$ ---------------------------- 19.40
Insol $P_2O_5$ ---------------------------- 1.09
Avail $P_2O_5$ ---------------------------- 18.31
Moisture --------------------------------- 7.73

A similar batch to the above, made by adding first 185 pounds of water to the mixer, then 750 pounds of 87% alkylation sludge acid so as to make an approximately 70% acid solution, and then 1200 pounds of finely pulverized phosphate rock, was mixed, "denned" and cured in the usual manner. The product analyzed as follows (ten days after manufacture):

Total $P_2O_5$ ---------------------------- 19.17
Insol $P_2O_5$ ---------------------------- .88
Avail $P_2O_5$ ---------------------------- 18.29
Water ------------------------------------ 5.97

The physical condition of this superphosphate was much superior to material made in the ordinary manner, being soft, granular, dry, and easily pulverized.

To illustrate the effect of only 5% alkylation sludge on the physical properties of superphosphate, when used with 95% ordinary sulphuric acid, by weight, the following operation is set forth.

Nine hundred and fifty pounds of ordinary commercial sulphuric acid having a strength of 69.65% was mixed with 50 pounds of 87% alkylation sludge acid; the mixture was used to acidulate 1200 pounds of finely pulverized phosphate rock. The mix was stirred until maximum foaming occurred, dumped into the "den," cured for thirty minutes, removed by a mechanical scraper, and stacked on a pile to age or dry out. The "denned" material was so "dry," granular, and free running at the end of the thirty-minute period that it actually ran out of the "den" like sand instead of having to be "cut" out in the usual manner. The product had a composition typical of normal operation:

Total $P_2O_5$ ---------------------------- 19.15
Insol $P_2O_5$ ---------------------------- .74
Avail $P_2O_5$ ---------------------------- 18.41
Water ------------------------------------ 9.35

In case it is desired to remove some of the organic carbon material present in the used acid so that the superphosphate fertilizer product contains less of such material, the used acid, as derived from the alkylation process, can be diluted with water until the acid is of a suitable strength for use in the rock acidulation. When this is done, some of the organic material in solution in the acid separates out and floats on the acid from which it readily separated. Dilution of the used acid to between about 60% and 70% $H_2SO_4$ usually suffices; the residual dilute used acid still carries sufficient of the organic material in solution to be of substantial benefit in the manufacture of superphosphate. For example, a used sulphuric acid from an alkylation operation was diluted to 64% by the addition of water following which the oil and tar which separated were removed. Four batches of phosphate rock weighing 300 pounds each were then treated with 1,000 pounds of the diluted used acid in a Steadman mixer. The temperature of the mixture rose appreciably and air was swept through the mixer to remove hydrocarbons and other materials vaporized by the reaction. After mixing, the material was dropped into a den where it was permitted to remain for several hours, after which it was removed to a pile and permitted to dry and cure. The material removed from the den was quite granular in nature. That present on the pile analyzed as follows:

| | |
|---|---|
| $P_2O_5$ total | 19.24 |
| Insol | 0.53 |
| $P_2O_5$ avail | 18.71 |
| Moisture | 7.84 |

The product on the pile was granular in nature and relatively free flowing.

The organic carbon material in solution in the alkylation acid can also be reduced by a suitable heat treatment without impairing the usefulness of the waste acid; in fact, as will presently appear, the superphosphate resulting from use of such a used acid possesses certain unique advantages. For example, if an alkylation acid is diluted with water to 60%–70% acid and is thereafter heated to between about 305° F. and 315° F. for a sufficient period, a very substantial portion of the hydrocarbons present form a porous, coke-like solid mass which can be readily separated from the acid sludge. The acid remaining is still black in color and contains about 1% of organic carbon material in solution and sufficient to be effective in the manufacture of superphosphate. For example, an 87% alkylation sulphuric acid sludge was diluted to 70% by water addition. Thereafter it was heated to 310° F.; after about one hour a coke-like mass had formed on the top of the acid. The particles of coke were quite large, generally about the size of walnuts. These were removed by skimming the coke off the surface of the acid. This acid was then permitted to cool after which it was applied to a previously prepared phosphate rock, the two being mixed in a suitable mixer in the proportions of twelve hundred pounds of the rock to one thousand pounds of the acid. The material after mixing was "denned" for six hours. The material removed from the den was quite dry and granular. It was then cured and dried for nine days when it analyzed as follows:

| | |
|---|---|
| $P_2O_5$ total | 19.83 |
| Insol | 0.77 |
| $P_2O_5$ avail | 19.06 |
| Moisture | 5.94 |

The material leaving the den was granular and pulverizing or milling was not necessary. The required $P_2O_5$ availability (citrate soluble $P_2O_5$) developed rapidly and any extended drying or curing was unnecessary. The final product was free of carbon tetrachloride soluble hydrocarbons.

By utilizing an alkylation acid sludge one is able to dispose of a refinery waste material, usually available at low cost as compared to fresh acid, in a simple manner. The curing and drying time is shortened very materially and, in addition, final milling or grinding is usually unnecessary. The material appears to granulate spontaneously while curing and drying into a form in which it is quite suitable for application as a fertilizer.

This is a continuation-in-part of application Serial No. 533,636, filed May 1, 1944.

I claim:

In a conventional den process for the manufacture of finely divided superphosphate fertilizer from phosphate rock, the steps consisting of mixing together finely divided phosphate rock and a used sulphuric acid, said used acid consisting essentially of sulphuric acid having in solution a small quantity of organic carbon containing material derived from an alkylation operation wherein an iso-paraffin is alkylated with an olefin in the presence of sulphuric acid as a catalyst, placing the acidulated rock in a den, reacting the rock and acid in the den at normal den temperatures until a pulverulent mass is formed, removing said pulverulent mass from the den, and thereafter allowing the pulverulent mass to stand until it is dry, granular and free flowing.

JOHN STAUFFER, JR.

REFERENCES CITED

The following references are of record in the file of this patent:

UNITED STATES PATENTS

| Number | Name | Date |
|---|---|---|
| 1,383,912 | Doyle | July 5, 1921 |
| 2,267,458 | Goldsby | Dec. 23, 1941 |

FOREIGN PATENTS

| Number | Country | Date |
|---|---|---|
| 365,945 | British | Jan. 28, 1932 |